United States Patent [19]

Bigey et al.

[11] Patent Number: 5,325,404
[45] Date of Patent: Jun. 28, 1994

[54] SYNCHRONIZATION DEVICE FOR PERFORMING SYNCHRONOUS CIRCUIT SWITCHING FUNCTIONS THRU AN ASYNCHRONOUS COMMUNICATION NODE

[75] Inventors: Jean-Claude Bigey, Saint Jeannet; Jean Calvignac, La Gaude; Jean-Christophe Debos, Nice; Rene Gallezot, Vence; Eric Saint-Georges, La Gaude, all of France

[73] Assignee: International Business Machines Corporation, Armonk, N.Y.

[21] Appl. No.: 836,492

[22] Filed: Feb. 18, 1992

[30] Foreign Application Priority Data

Feb. 21, 1991 [EP] European Pat. Off. ......... 91480024.8

[51] Int. Cl.$^5$ .............................................. H04L 7/00
[52] U.S. Cl. ................................... 375/106; 370/102; 370/105.1; 370/68
[58] Field of Search ................. 375/106, 112; 370/68, 370/105.1, 102, 58.1, 100.1, 58.2, 66, 67, 58.3, 91

[56] References Cited

U.S. PATENT DOCUMENTS

| | | | |
|---|---|---|---|
| 3,868,481 | 2/1975 | Patrusky et al. | 370/102 |
| 4,661,966 | 4/1987 | Schreiner | 375/112 |
| 5,134,636 | 7/1992 | Barucchi et al. | 375/106 |
| 5,144,620 | 9/1992 | Ishizaki et al. | 375/112 |

FOREIGN PATENT DOCUMENTS 0232437  8/1987  European Pat. Off. ...... G06F 13/42

*Primary Examiner*—Stephen Chin
*Assistant Examiner*—Hai H. Phan
*Attorney, Agent, or Firm*—Joscelyn G. Cockburn

[57] ABSTRACT

In a communication node (10) which comprises switching device (24) operating under control of a clock signal of period T for exchanging information slots carried in external frames of period T' comprising n slots, with each slot comprising a x-bit data byte, between external Time Division Multiplex TDM links (12,14) attached to the communication node, a synchronization device prevents the slippage phenomena due to the asynchronies between T and T' from causing a loss of data slots by generating at the input of the switching means internal frames from the received external frames. These internal frames are synchronous with the clock signal of period T and have a format which allows the slippage to be compensated.

7 Claims, 11 Drawing Sheets

SYNCHRONIZATION DEVICE FOR PERFORMING SYNCHRONOUS CIRCUIT SWITCHING FUNCTIONS THRU AN ASYNCHRONOUS COMMUNICATION NODE

DESCRIPTION OF THE INVENTION

The present invention relates to a synchronization device implemented in an asynchronous communication node, allowing synchronous circuit switching functions to be performed without any slippage between synchronous interfaces.

BACKGROUND OF THE INVENTION

The current communication nodes able to perform circuit switching functions between synchronous link interfaces such as channelized time division multiplex on primary access links have an internal timing clock which is synchronized with the clock of one of the synchronous link interfaces. This prevents synchronous interfaces belonging to different Carriers not synchronized between them from being interconnected.

In such an environment, the internal timing clock of the node is synchronized with the timing clock of one Carrier by means of a phase locked loop, so that the circuit switching functions can be performed between interfaces belonging to this Carrier without any slippage.

However, since the node internal timing clock cannot be synchronized with the timing clocks of the other Carriers, the circuit switching functions between the interfaces belonging to these Carriers cannot be performed without any slippage, which is a major drawback.

In addition, the implementation of the Phase Locked Loop in charge of the synchronization of the internal timing clock of the node with the clock of one of the Carriers is complex and difficult to implement at high speed.

SUMMARY OF THE INVENTION

An object of the invention is to provide a communication node with a synchronization device for accommodating several families of synchronous interfaces belonging to different Carriers.

Another object of the invention is to provide such a device which allows the network interfaces belonging to the same Carrier to be interconnected through an asynchronous communication node without any slippage.

Another object of the invention is to provide a communication node with such a device so that the node does not need a very accurate internal timing clock.

The synchronization device according to the present invention is implemented in a communication node which comprises switching means operating under control of a clock signal of period T for exchanging information slots carried in external frames of period T' comprising n slots, with each slot comprising a x-bit data byte, between external Time Division Multiplex TDM links attached to the communication node. The synchronization device prevents the slippage phenomena due to the asynchronies between T and T' from causing a loss of data slots by generating at the input of the slot switching means internal frames from the received external frames. These internal frames are synchronous with the clock signal of period T and have a format which allows the slippage to be compensated for.

It comprises internal links attached to the circuit switching means, encoding means for generating the internal frames on the internal links from the frames received from the external links and decoding means for receiving the internal frames from the circuit switching means and regenerating the external frames to be sent on the external links.

The internal frames of period T sent on the internal links in successive periods T by the encoding means comprise slots of y bits, with y higher than x+r, where r is an integer number comprised between 1 and x: $1 \leq r < x$.

The encoding means are responsive to the contents of each slot "j", with j=1 to n received during successive periods T' from each external link for configuring a corresponding slot "j" during each period T, said corresponding slot "j" comprising a number d of data bits comprised between 0 and x+r. The number d of data bits is indicated by an encoding of the y−d remaining bits of the slot.

In a preferred embodiment of the invention, y is equal to at least x+r+1+m, where m is an integer number such as $2^m$ is at least equal to x.

The number d of data bits is equal to 0 if no byte from the slot "j" has been received from the external frame, or is equal to d if one byte from the slot "j" has been received or is comprised between x and x+r from the time where two bytes have been received from two slots "j" of two external frames, in that case the slot "j" on the internal link comprises data bits taken from two successively received bytes, and the position of a reference bit, for example the most significant bit of the second byte is encoded by means of the m additional bits.

The decoding means are responsive to the contents of each slot "j" received from each internal link for preparing the byte to be sent in the corresponding slot of the external frame.

BRIEF DESCRIPTION OF THE FIGURES

FIGS. 3A and 3B and FIG. 4 represent how the synchronization device according to the subject invention allows the slippage phenomena to be corrected.

DETAILED DESCRIPTION OF THE INVENTION

A communication node is connected to a plurality of communication links possibly belonging to different Carriers through receive and transmit interfaces. Its main function is to route information from one link to another link in order to exchange information between users respectively attached to said links. When the information is of the circuit type, it must be switched without any slippage to insure that the communication between the users is of a good quality.

Figure 1:
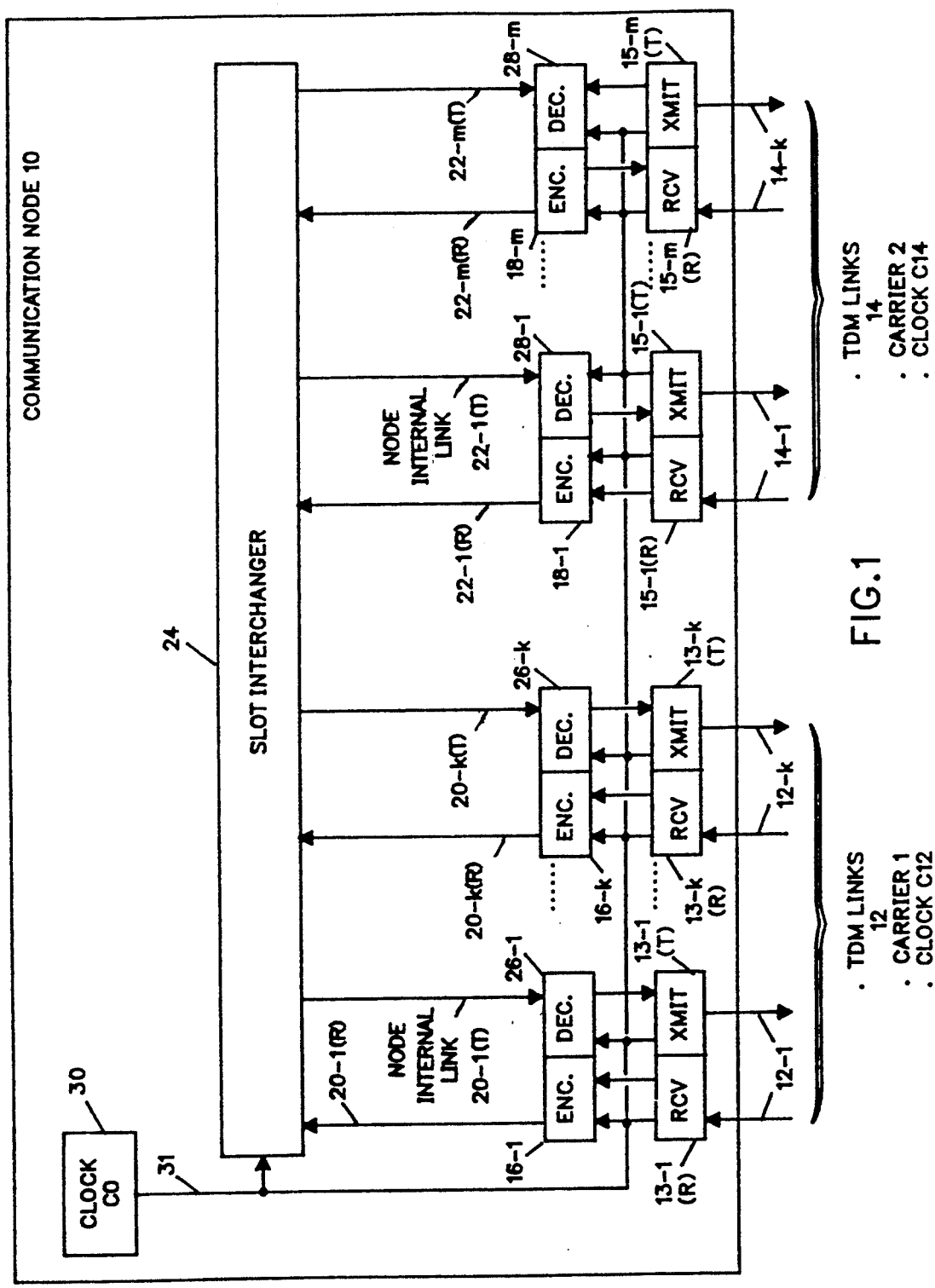
FIG. 1 represents the block diagram of the communication node incorporating the synchronization device according to the subject invention.

A communication node 10 is schematically represented in FIG. 1. It is connected to a plurality of links belonging to different Carriers such as links 12-1 to 12-k belonging to a first Carrier 1, on which the information is carried under control of a network clock signal C12 and links 14-1 to 14-m belonging to a second Carrier 2, on which information is carried under control of a clock signal C14 which is not exactly synchronized with C12.

The links belonging to Carriers 1 and 2 carry Time Division Multiplex Frames comprising up to 32 channels of 64 kilobits per second.

The communication node is able to support different framing, for example the T1 Superframe format Sf and Extended Superframe format ESF and the CEPT frame format (CEPT means Conference Européenne des Postes et Télécommunication).

The SF and ESF frames comprise 24 slots of 8 bits plus a flag bit per $T' \simeq 125$ microsecond period, this corresponds to a network clock signal having a frequency of 1.544 megabits per second. The CEPT frames comprise 31 slots of 8 bits plus a 8-bit flag slot per $T' \simeq 125$ microsecond period. This corresponds to a network clock signal having a frequency of 2.048 megabits per second.

The information is received from the links 12-1 to 12-k and 14-1 to 14-m at the receive interfaces 13-1(R) to 13-k(R) and 15-1(R) to 15-m(R) of the node, respectively. The information is sent to the links 12-1 to 12-k and 14-1 to 14-m through the transmit interfaces 13-1(T) to 13-k(T) and 15-1(T) to 15-m(T) of the node.

The 8-bit channels received each T' period (T'=T12) by the receive interfaces 13-1(R) to 13-k(R) and 15-1(R) to 15-m(R) are processed by encoding circuits 16-1 to 16-k and 18-1 to 18-m respectively. These encoding circuits transform the frames received from the TDM links into node internal frames on receive internal links 20-1(R) to 20-k(R) and 22-1(R) to 22-m(R), respectively.

The receive internal links are connected to a slot interchanger device 24 the function of which is to switch the slots between the receive internal links 20-1(R) to 20-k(R) and 22-1(R) to 22-m(R) and transmit internal links 20-1(T) to 20-k(T) and 22-1(T) to 22-m(T).

The transmit internal links 20-k(T) to 20-n(T) and 22-1(T) to 22-m(T) are connected to decoding circuits 26-1 to 26-k and 28-1 to 28-m which transform the internal frame formats into the frame formats supported by the transmit interfaces 13-1(T) to 13-k(T) and 15-1(T) to 15.-m(T) respectively.

The communication node is provided with a clock circuit 30 which generates an internal clock signal C0 on its output line 31 to control the operation of the slot interchanger device 24 and encoding and decoding circuits 16, 26 and 18,28.

This clock signal may not be synchronized with the network clock signals C12 and C14.

According to the present invention, the encoding and decoding circuits accommodate the asynchronies between the clocks signals C0 and C12 and C0 and C14 to eliminate any slippage when slots are interchanged between two TDM links belonging to the same Carrier.

In a preferred embodiment of the invention, the frame format on the network internal links 20 and 22 is derived from the format described in U.S. Pat. No. 4,760,573.

A slot offering in the frames on the node internal links corresponds to a 8-bit channel on the network TDM links (x=8). The slot offering is comprised of two parts: a data part and a control part as shown in FIG. 2.

A 8-bit channel received each T' period from a TDM link, for example 12-1 through the receive interface 13-1(R) is posted by the encoding circuit 16-1 into a dedicated slot in the frames on the node internal link 20-1(R) each T period (T=T0) as defined by the clock signal C0 on line 31, which is not synchronized with the clock signal C12.

In order to avoid the slippage phenomena due to the clock asynchronies which would imply a loss of data, the frame format on the node internal link allows one additional bit to be added to the 8 bits of the data part of the slot.

Figure 2:
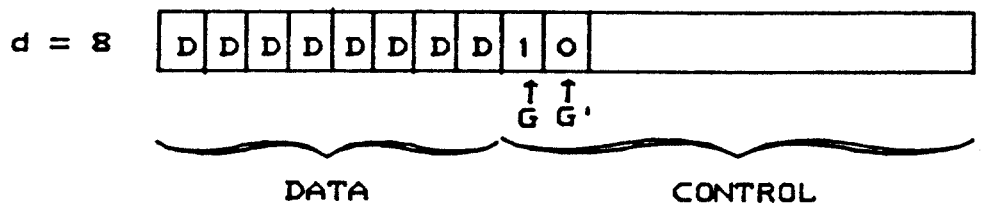
FIG. 2 represents the format of the slot on the internal links in a preferred embodiment of the invention.
Figure 2:
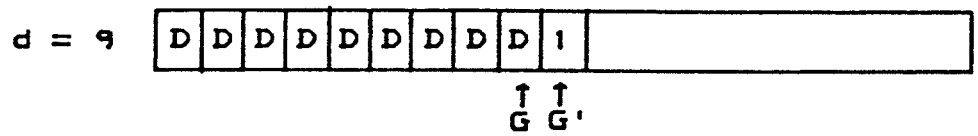
Figure 2:
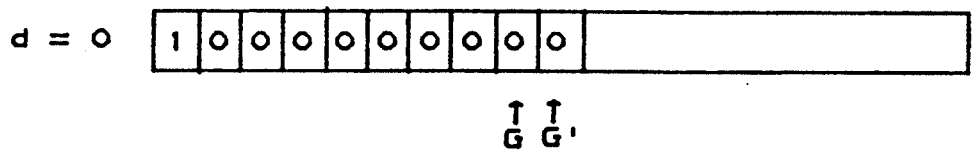

As shown in FIG. 2, one slot of the frames on the internal link comprises 16 bit positions: 0 to 15. The data part is comprised of bit positions 0 to 7 and the control part is comprised of positions 8 to 15. Two bit positions in the control part, for example bit positions 9 and 10 are used as global validation bits G and G' respectively instead of only one bit G in the above described patent. G and G' set to 10 represent the variable delimiter configuration which indicates that the data slot comprises d=8 valid data bits D.

G' set to 1 indicate that the slot comprises d=9 data bits D in bit positions 0 to 8.

G and G' set to 00 indicates that the variable delimiter configuration is in the data part of the slot which means that the slot comprises less than eight valid data bits D. In FIG. 2, the variable delimiter configuration indicates that d=0.

More validation bits can be provided in order to be able to send a number r of additional bits. The number of global validation bits is equal to r+1.

Figure 3A:
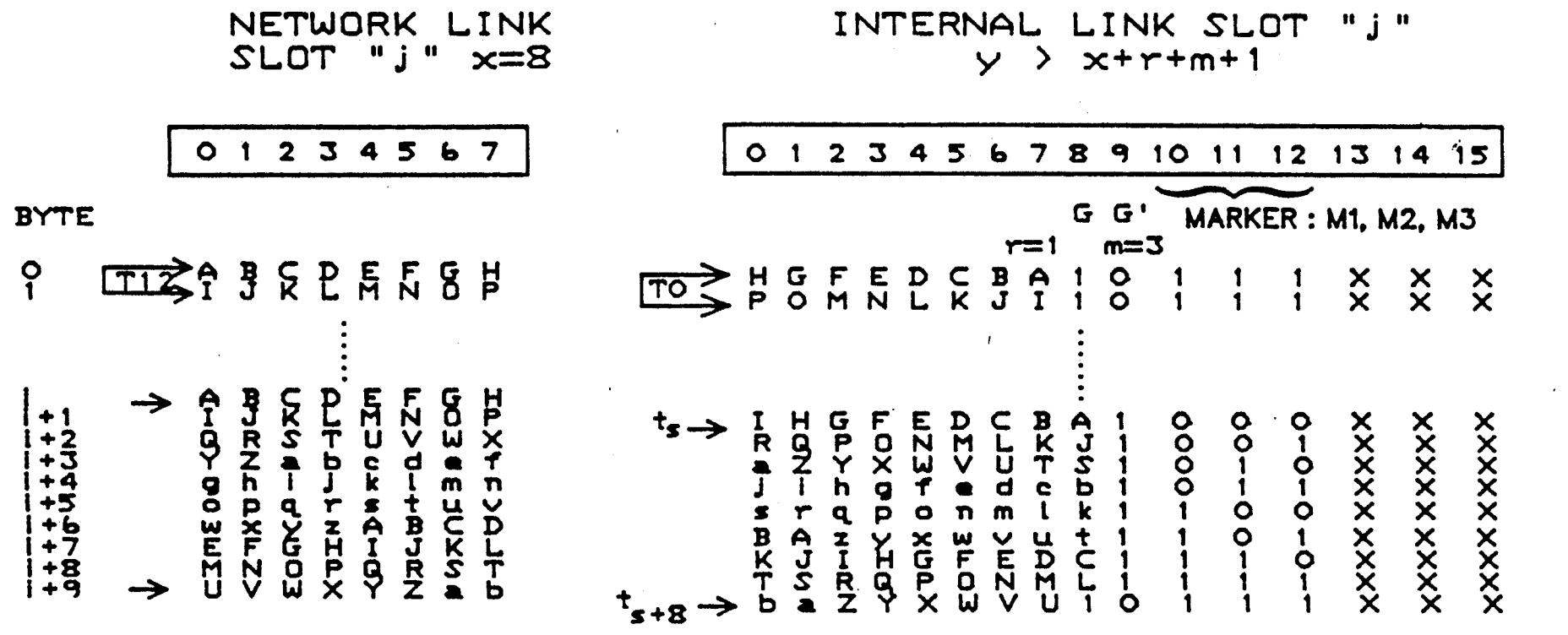
Figure 3B:
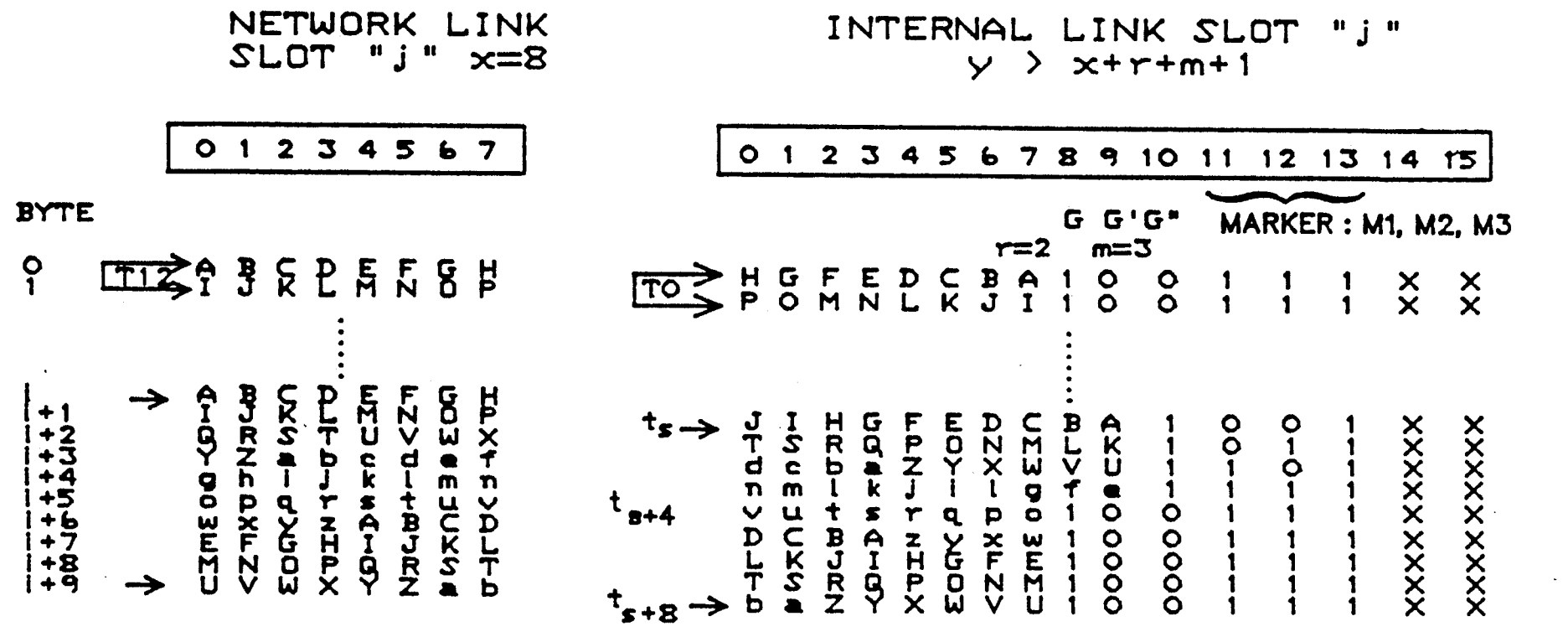
Figure 4:
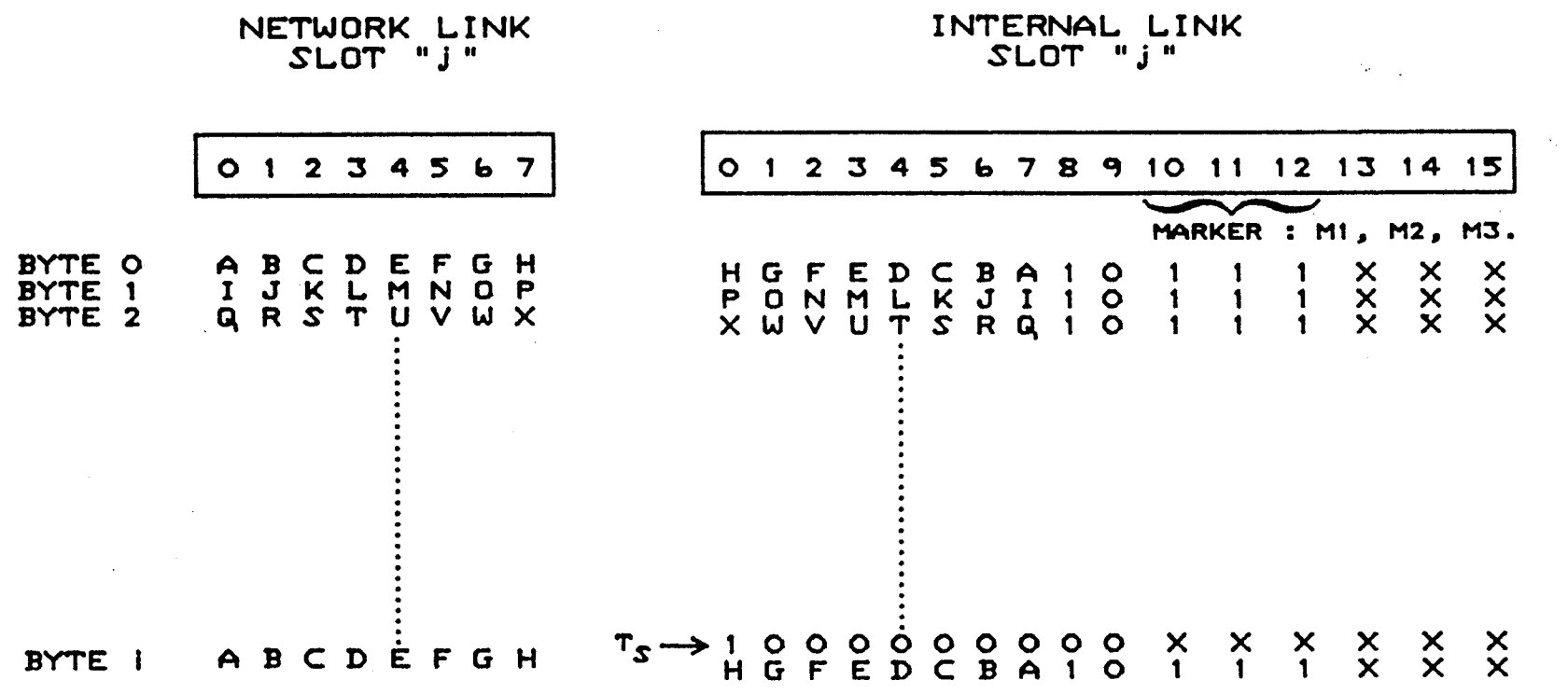

The concept of the subject invention is represented in the FIGS. 3A, 3B and 4. FIGS. 3A, 3B and 4 represent the mapping of the received bytes in a slot numbered "j" of successive T12 periods from a network link such as 12-1 and the bits in the slot numbered "j" of successive T0 periods on the internal link. T12 and T0 are the periods containing the TDM slots on the network link and internal link 12-1 and 20-1(R) respectively, they are close to 125 microseconds but may be slightly different, which results in the slippage phenomena described before. FIGS. 3A and 3B represent how the present invention solves the problem resulting from the slippage phenomena when T0 is longer than T12 and FIG. 4 represents how the present invention solves the problem resulting from the slippage phenomena when T0 is shorter than T12.

In FIGS. 3A, 3B and 4, the bytes received from the network are shown on the left side and the corresponding slot contents on the internal link are shown on the right side.

As shown in FIGS. 3A and 3B, during each period T12 one byte is received in the slot "j" from the network link. Bytes 0 to i+9 are represented. These bytes are sent in the corresponding slots "j" in successive T0 periods on the internal link. FIG. 3A shows the internal slot configuration in case r=1 and FIG. 3B shows the internal slot configuration in case r=2.

A number of bytes: byte 0 to byte i−1 (not shown) are received and are sent in the corresponding slot "j" on the internal link, the bits in the positions 0 to 7 of the internal link slot are the bits in the positions 7 to 0 of the network link slot, the G and G' bits are set to 10 (r 1 ; FIG. 3A) or G G' G" bits are set to 100 (r=2; FIG. 3B) which means that the data part contains 8 data bits and the marker bits M1, M2 and M3 are set to 111 meaning that the bit position 7 contains the most significant (or first bit) bit taken as reference bit of a received byte.

Any bit position could have been chosen as reference bit position, for example bit position 0.

Then, due to the slippage resulting from the difference between T12 and T0, byte i and byte i+1 are received from the network while no byte has been sent on the internal link. From that time ts, the encoding circuit compensates the clock shifting, by using the bit G if r=1 or bits G and G' if r=2 of the control slot to send 9 data bits or 10 data bits comprising the bits of byte Bi and one additional bit (bit I) or two additional bits of byte Bi+1 respectively.

If r=1 (FIG. 3A), the bit G' is set to 1 to indicate that G bit is a data bit and the marker bits M1,M2,M3 are set to 000. This indicates that the bit positions 8 to 1 of the 16-bit slot on the internal link comprise bits 0 to 7 of a received byte Bi and bit position 0 comprises the first bit of the next byte Bi+1. In the next period T0, the remaining bits of byte Bi+1 are sent in bit positions 8 to 2 and two bits of the next byte Bi+2 are sent in bit positions 0 and 1. The marker bits M1,M2,M3 are set to 001 indicating that the first bit of byte Bi+2 is in bit position 1.

The same process occurs as shown in FIG. 3A until time ts+8 where the byte i+9 is perfectly realigned in the bit positions 0 to 7 of the data part of the slot on the internal link with bits G and G' set to 10 and the marker bits set to 111.

If r=2 (FIG. 3B), the same process occurs. From the time ts, x+r=10 bits are sent. The marker is first set at the value 001, meaning that the most significant bit is in bit position 1 and then it is incremented by r=2 in the successive periods T until the byte re-alignement occurs at time ts+4.

The value of the marker bits allows the byte alignment to be recovered on the transmit side 20-1(T) as will be described later on, since it indicates the position of the first bit of the received bytes.

Thus there is no loss of data bytes.

It has been assumed that the G bit, or G and G' bits, can be used to transfer a data bit in the slots of each period T12, but depending upon the implementation this facility can be offered only in some frame, for example one frame out of two. In that cases more frames would be needed to have a perfect mapping of the bytes in the received slots with the bytes in the slots on the internal link.

The spare bits in the control part can be used for any purpose, such as exchanging control information as described in the patent referenced above.

When T12 is longer than T0, as shown in FIG. 4, it happens that at some time such as ts, no byte is received from the network link. In the slot offering on the node internal link, an empty data slot is sent, as indicated by the 1 in the bit position 0 of the data part and 0 in position 1 to 9 if r=1. The value of the marker bits have no significance. The case where r is different from 1 is not shown.

Figure 5:
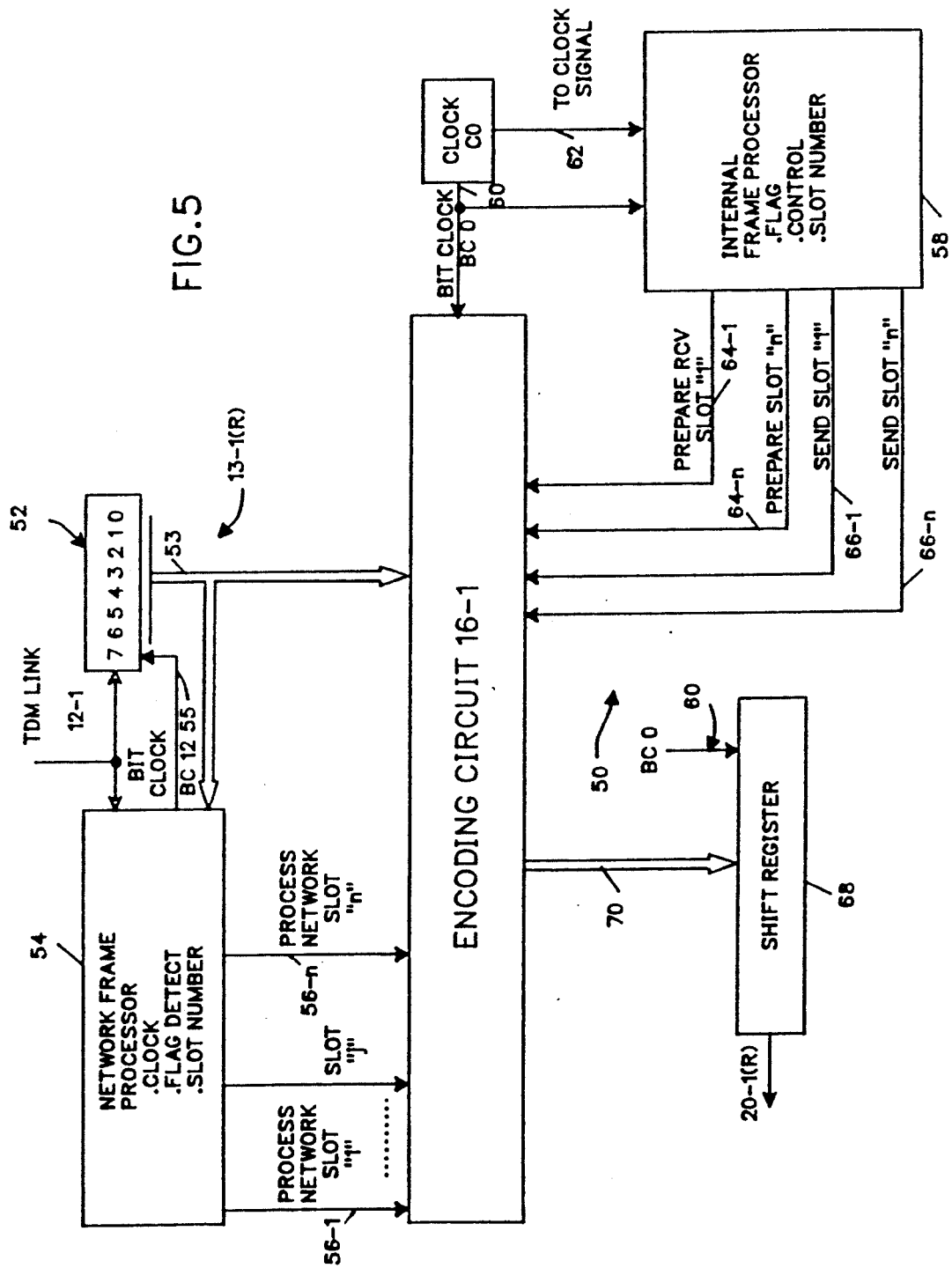
FIG. 5 represents the block diagram of an encoding circuit for generating the internal frames.

The FIG. 5 represents the block diagram of the receive part of a TDM link such as 12-1 comprising the receive interface 13-1, the encoding circuit 16-1 and a circuit 50 for controlling the generation of the bit slots in successive periods T0 on the node internal link 20-1(R).

The successive slots in the periods T12 on link 12-1 will be called network frames and the successive slots in the periods T0 on node internal link 20-1(R) will be called internal frames.

The detailed description of one implementation of the invention will be made assuming r=1 and x=8.

The TDM link 12-1 is provided as input to a deserializer shift register 52 and to a network frame processor 54 which recovers the bit clock signal BC12 and provides this signal on line 55. The bit stream from the TDM network link is shifted into the deserializer 52 under control of the bit clock signal BC12 on line 55. The contents of the shift register 52 is provided to the network frame processor 54 through bus 53. The processor recognizes the flags indicating the beginning of the network frames comprising 8-bit data slots 1 to n.

The network frame processor 54 generates from the flag detection and the bit clock signal BC12, PROCESS NETWORK SLOT "j" signals, with j equal 1 to n, on output lines 56-j, with one line for example line 56-j being active to indicate that the deserializer contains the slot "j" which has to be processed by the encoding circuit 16-1 to generate the internal frames.

An internal frame processor 58 operating under control of clock circuit 30 controls the generation of the internal control frames on the node internal link. It generates a first clock signal BC0 on line 60 which is the bit clock signal on the internal links 20 and 22, and a second signal on line 62 which defines the internal node T0 period.

In response to these bit clock BC0 and T0 clock signals on lines 60 and 62, the internal frame processor 58 generates PREPARE SLOT "j" signals with j=1 to n on output lines 64-j which are provided to encoding circuit 16-1 in order it arranges the bits of the slots 1 to n of the internal frames as described according to the format described in FIGS. 3 and 4.

It also generates SEND SLOT "j" signals on output lines 66-j which cause the contents of each internal frame slot prepared by the encoding circuit 16-1 to be gated at the right time into a serializer shift register 68 through bus 70 to be sent on the node internal link 20-1(R) under control of the bit clock signal BC0.

Figure 6:
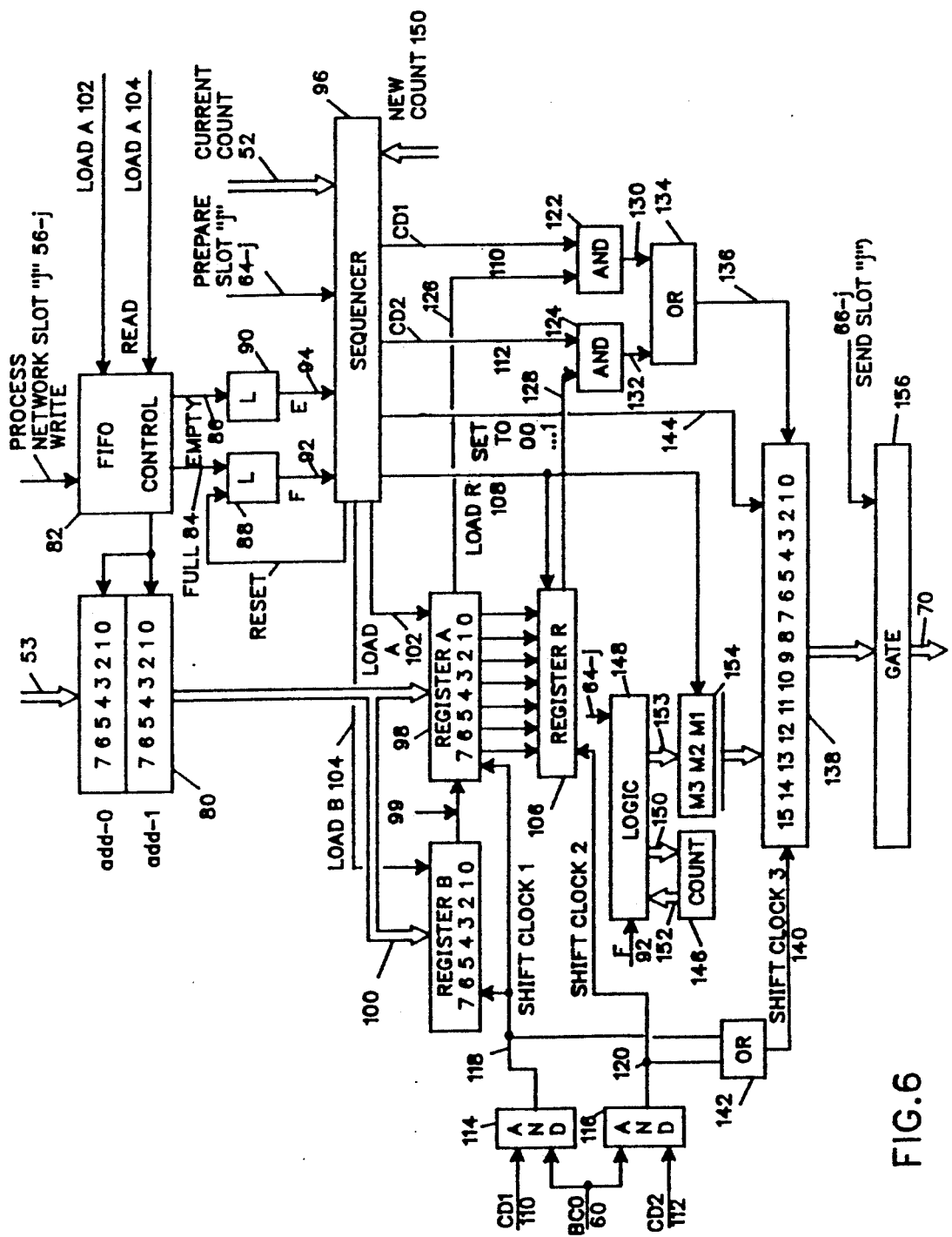
FIG. 6 represents the implementation of the logic circuitry needed for preparing a slot of the internal frames.

Encoding circuit 16-1 comprises a circuit such as shown in FIG. 6 for each slot of an internal frame.

The circuit shown in FIG. 6 is the encoding circuit dedicated to the preparation of slot "j" of the successive frames. It is responsive to the activation of PREPARE SLOT "j" line 56-j by the network frame processor 54 and to the activation of PREPARE SLOT "j" line and SEND SLOT "j" line 64-j and 66-j by the internal frame processor.

This encoding circuit comprises a first in-first out FIFO memory 80 having two 8-bit positions at addresses 0 and 1 and a conventional FIFO control circuit 82 which manages the FIFO read and write operations and generates two signals FULL and EMPTY on lines 84 and 86 indicating whether the two positions of the FIFO memory are full or empty. These signals are latched in latches 88 and 90 which provide the FULL and EMPTY signals on their output lines 92 and 94 to a sequencing logic circuit 96 which control the generation of the contents of the slot "j" to be sent on the internal link.

The FIFO memory allows the contents of two slots "j" pertaining to two network frames to be buffered, in case a slot arrives while the previous slot has not been sent on the internal link, as shown in FIG. 3.

The slot "j" contents from bus 53 is loaded into the FIFO memory when the PROCESS NETWORK slot "j" signal on line 56-j is active. If the FIFO memory is empty it is loaded at address 0 and if it is not empty and not full it is loaded at address 1.

The contents of the FIFO memory are loaded into registers A and B 98 and 100 under control of LOAD A and LOAD B signals generated by the sequencing logic 96 on lines 102 and 104, respectively. These signals are provided as read control signals to FIFO control circuit 82.

The contents of bit positions 0 to 6 of register A 98 is loaded into 7-bit position register R 106 under control of a LOAD R signal generated by the sequencing logic 96 on line 108.

The sequencing logic 96 also generates two control signals CD1 and CD2 on lines 110 and 112. These signals are provided to one input of AND gates 114 and 116 respectively which gates the bit clock signal BC0 from line 60 during the time periods where CD1 and CD 2 signals are active to cause the contents of registers 98, 100 and 106 to be shifted a number of times which depends upon CD1 and CD2.

Register B 100 and register A 98 are connected as a shift register through line 99 so that the bit in position 0 of register B is shifted into position 7 of register A under control of the shift clock 1 signal on line 118.

AND gates 122 and 124 are conditioned by the control signals CD1 and CD2 respectively on the lines 110 and 112 to gate the bit stream shifted out registers A and B from line 126 and from register R on its output line 128, on their output lines 130 and 132 respectively. OR gate 134 transfers the serial bit stream from line 130 or 132 on its output line 136. The bit stream is shifted into 16-bit position shift register 137 under control of shift clock 3 signal on line 140 which results from the ORing by circuit 142 of shift clock 1 and shift clock 2 signals on lines 118 and 120.

The sequencing logic 96 generates the control signals LOAD A, LOAD B, LOAD R CD1, CD2 in response to the PREPARE SLOT "j" signals from line 64-j, the FULL and EMPTY signals and from a CURRENT COUNT value provided from bus 152 which is indicative of the number of data bits in register R 106. In addition, when the signal on line 64-j becomes active, sequencing logic 96 sets the contents of bit positions 9 to 0 of register 138 to 000 . . . 01 through a control signal on line 144 which allows the correct getting of the bits G G' to be obtained at the end of the encoding operations.

COUNT register 146 is loaded by a COUNT value representative of the number of bits remaining from a previous slot "j" and have to be sent in the current slot "j", as shown in FIG. 3 after the time where two bytes have been simultaneously present in the FIFO Memory.

The COUNT value for the next frame is generated by logic circuit 146 on bus 150 to be stored in COUNT register 148 from the FULL signal from line 92, the current COUNT value from bus 152. Logic circuit 148 also generates the marker bits M1,M2,M3 in register 154. These bits are loaded into bit positions 10,11 and 12 of register 138 by the LOAD R control signal on line 108.

At the end of the PREPARE SLOT "j" time, the register 138 contains the bit configuration to be sent on the internal link during slot "j" offering, in accordance with the description of FIGS. 3 and 4.

The bit configuration in register 138 is gated into shift register 68 (FIG. 5) through gate 156 by SEND SLOT "j" signal from line 66-j.

Figure 7:
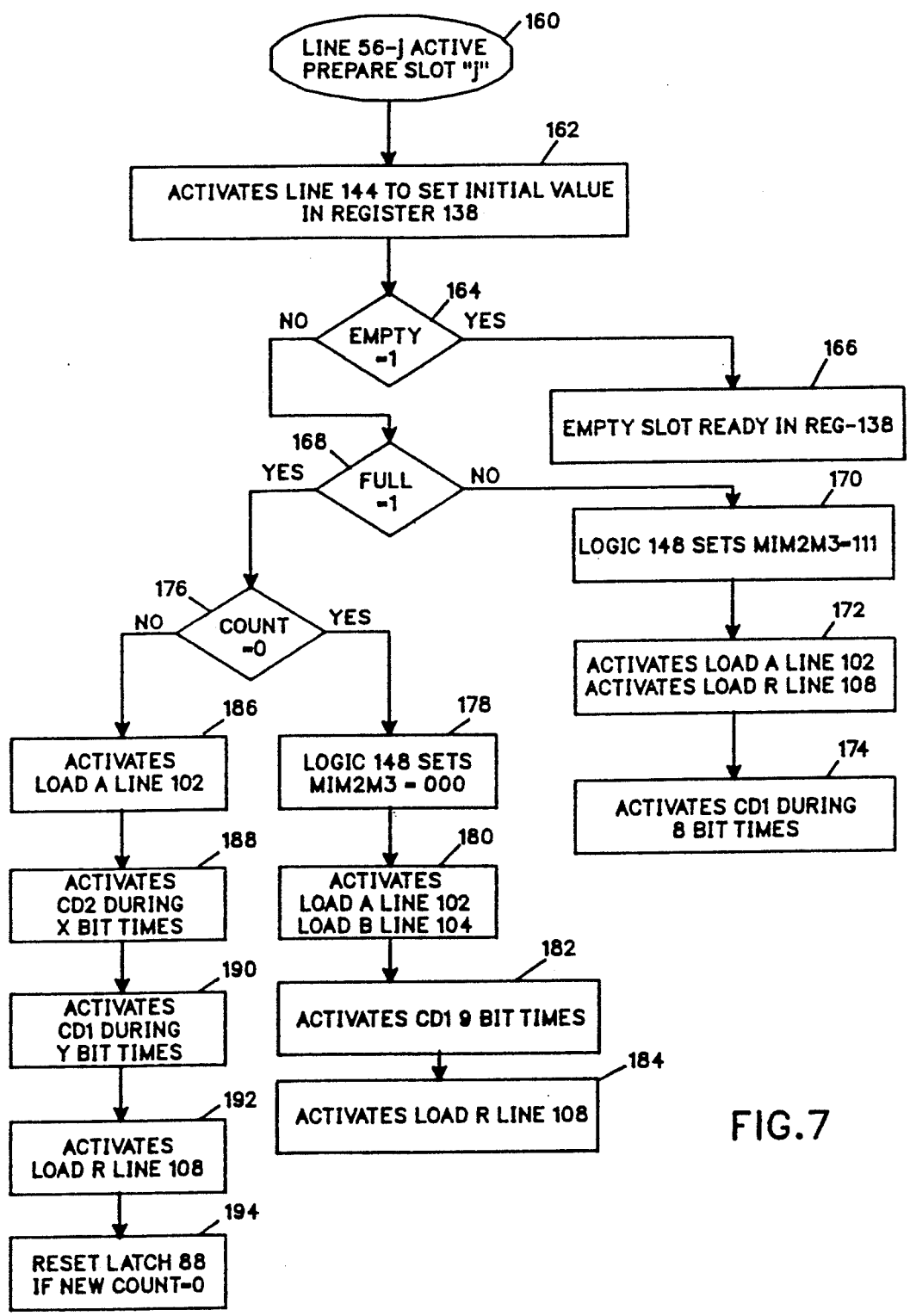
FIGS. 7 and 8 represent the sequential operations performed by logic circuits 96 and 148 of FIG. 6.

FIG. 7 represents the sequential operations which are performed under control of the sequencing device 96 and logic 148 to prepare the slot "j" of the internal frames.

The preparation of the slot "j" starts when line 56-j is activated, event 160.

In response thereto, the sequencing logic 96 activates line 144 to set register 138 at its initial value XXXXXX0000000001, X meaning "don't care" (operation 162).

The output of the EMPTY latch 90 is tested (operation 164). If it is equal to 1 meaning that an empty slot has to be sent, the operation of the sequencing device is completed (166) since the empty slot is contained in register 138.

If not, the FULL latch 88 status is tested (operation 168).

If this latch is not set, logic 148 sets marker bits M1M2M3 to 111, (operation 170). Then, sequencing logic 96 activates LOAD A line 102 and load R line 108 (operation 172), so that the byte in FIFO memory 80 is loaded into register A 98 and the marker bits are loaded at bit positions 10, 11, 12 of register 138. Sequencing logic 96 activates CD1 during eight bit times CB0 (operation 174). This causes the contents of register A 98 to be shifted into register 138 and due to the initial value which was set in this register the G and G' are set to the 10 value, meaning that the data part of the slot comprises eight data bits. The slot contents is ready in register 138.

If it is found at operation 168 that FULL latch 88 is set, the current count value provided to sequencing logic 96 through bus 152 is tested (operation 176). If this value is found equal to 0, which means that two bytes are stored in FIFO memory 80, logic 148 sets marker bits to 000 (operation 178). The sequencing logic 96 activates LOAD A line 102 and LOAD B line 104 (operation 180). This causes the byte at address 0 of the FIFO memory to be loaded into register A 98, the byte at address 1 of the FIFO memory to be loaded into register B 100.

Then, sequencing logic 96 activates the CD1 line during 9 bit times (operation 182). Thus the contents of register A is shifted into bit positions 8 to 1 of register 138, and the contents of bit position 0 of register B is shifted in bit position 0 of register 138. The sequencing logic 96 activates the LOAD R line 108 (operation 184) which causes the marker bits 000 to be loaded into register 138 and the contents of bit positions 0 to 6 of register A to be loaded into remainder register R 106.

If it is found at operation 176 that the count value is not equal to 0, the sequencing logic 96 activates load A line 102, (operation 186). Then, it activates CD2 during X bit times, with X equal to the current count value, (operation 188) and then it activated CD1 during Y bit times (operation 190), with Y=9−X. This causes the contents of the remaining bits in register R 106 to be shifted into register 138 concatenated with a number of bits of the new byte which depends upon the current count value, as shown in FIG. 3. Then, load R line 108 is activated (operation 192) to load the marker bits computed by logic 148, as will be described in reference to FIG. 8, into shift register 138 and the contents of bit positions 0 to 6 of register A 98 into register R 106.

Then, latch 88 is reset if sequencing logic 96 found that the new count value is equal to 0 (operation 194).

Figure 8:
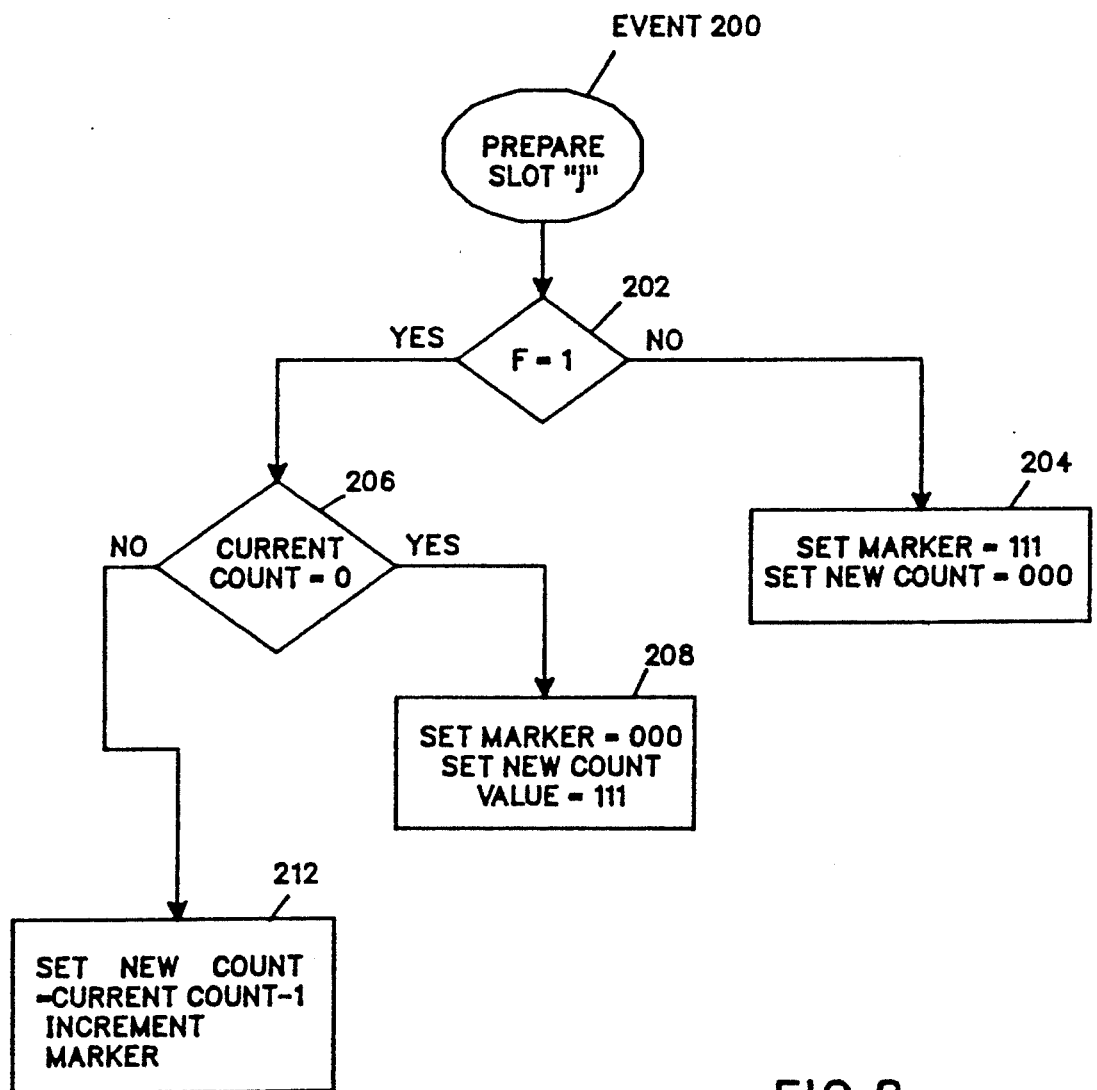

The operations performed by logic 148 to compute and set the count value and marker in registers 146 and 154 are shown in FIG. 8.

The operations of this logic circuit start when line PREPARE SLOT "j" 64-j becomes active, (event 200).

The status of latch 88 is tested, (operation 202). If the latch 88 is not set, logic 148 sets the marker bits to 111 and the count value to 000 through bus 150 and 153 respectively, (operation 204).

If the latch is set, the current count value provided through bus 152 is tested (operation 206). If it is equal to 0, meaning that a first bit of the second received byte is to be sent together with the first received byte stored in FIFO memory 80 in order to start the slippage correction, the marker bits are set to 000 and the new count value is set to 111, (operation 208).

If it is different from 0, the current count value is decremented (operation 210) and the marker is incremented (operation 212).

The implementation of the operations described in reference to FIGS. 7 and 8 in the sequencing logic circuit 96 and in logic 148 allows the received slots to be rearranged in the frames on the internal links, as shown in reference to FIGS. 3 and 4.

For the sake of explanation, FIG. 6 has been described in connection with the processing of one slot contents, namely slot "j", it will be obvious for the man skilled in the art, that most components of the slot encoding circuit shown in FIG. 6 can be shared by all slot encoding circuits devoted to the processing of the slots of the frames, by providing for an adequate sequencing of the operations performed on the successive slots.

Figure 9:
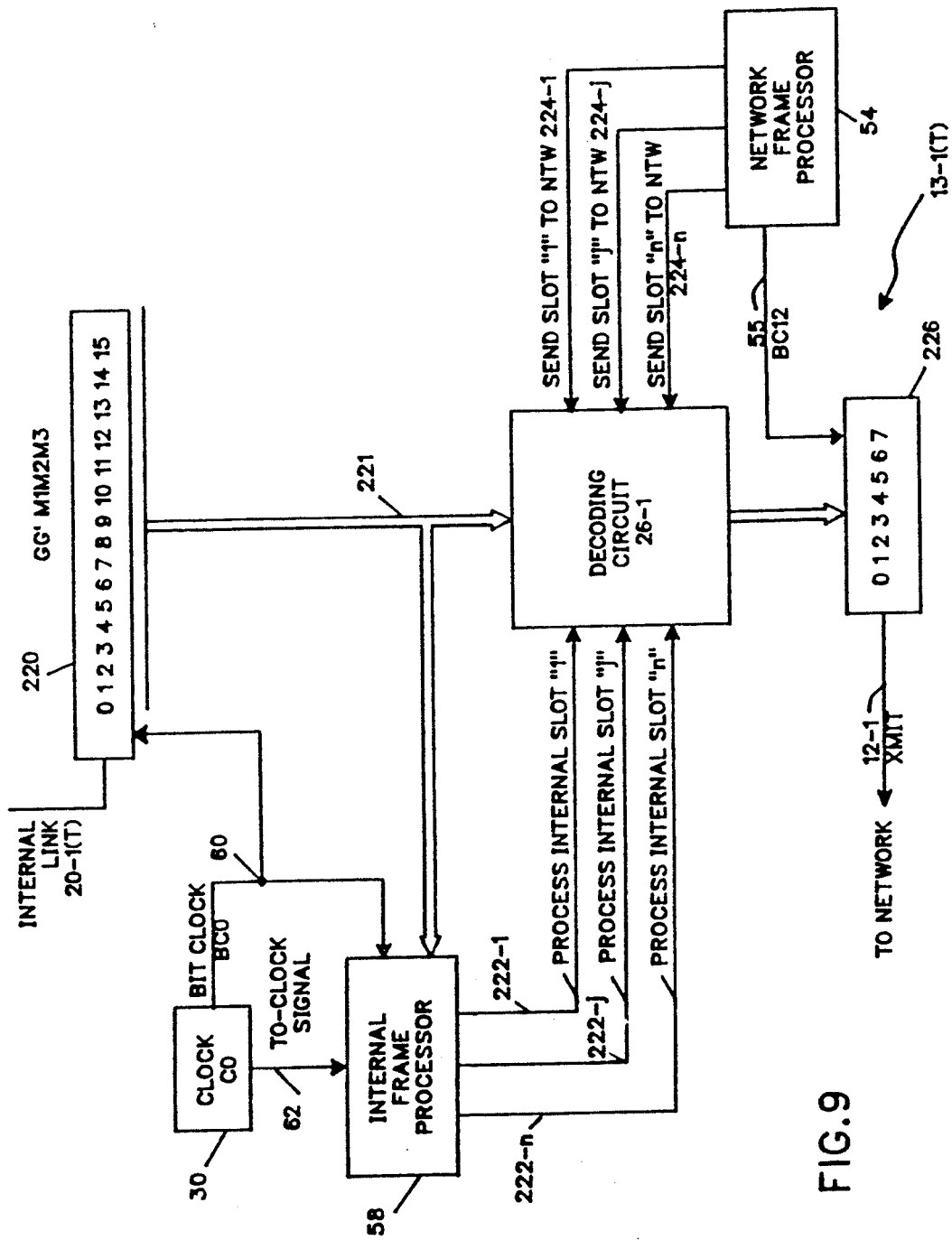
FIG. 9 represents the block diagram of the decoding circuit such as 26-1.

FIG. 9 shows the block diagram of the decoding circuit 26-1. The bit stream from the internal link 20-1 is deserialized in 16-bit shift register 220, under control of bit clock signal BC0 on line 60 from clock circuit 30. The contents of shift register 220 is provided to internal frame processor 58 which generates PROCESS INTERNAL SLOT "j" control signals on output lines 222-j from the shift register contents, bit clock signal on line 60 and T0 clock signal on line 62. The contents of the successive slots on the internal link are provided to decoding circuit 26-1 by means of the PROCESS INTERNAL SLOT "j" signals on control lines 222-j. Decoding circuit 26-1 generates the slot contents to be sent to the network link 12-1 by decoding the G and G' bits and marker bits.

Network frame processor 54 provides SEND SLOT "j" to NETWORK control signals on lines 224-j which causes the decoding circuit 26-1 to gate the corresponding slot contents in 8-bit shift register 226, the contents of which is shifted by clock signal BC12 on line 55 in order to generate the network frames on link 12-1.

Figure 10:
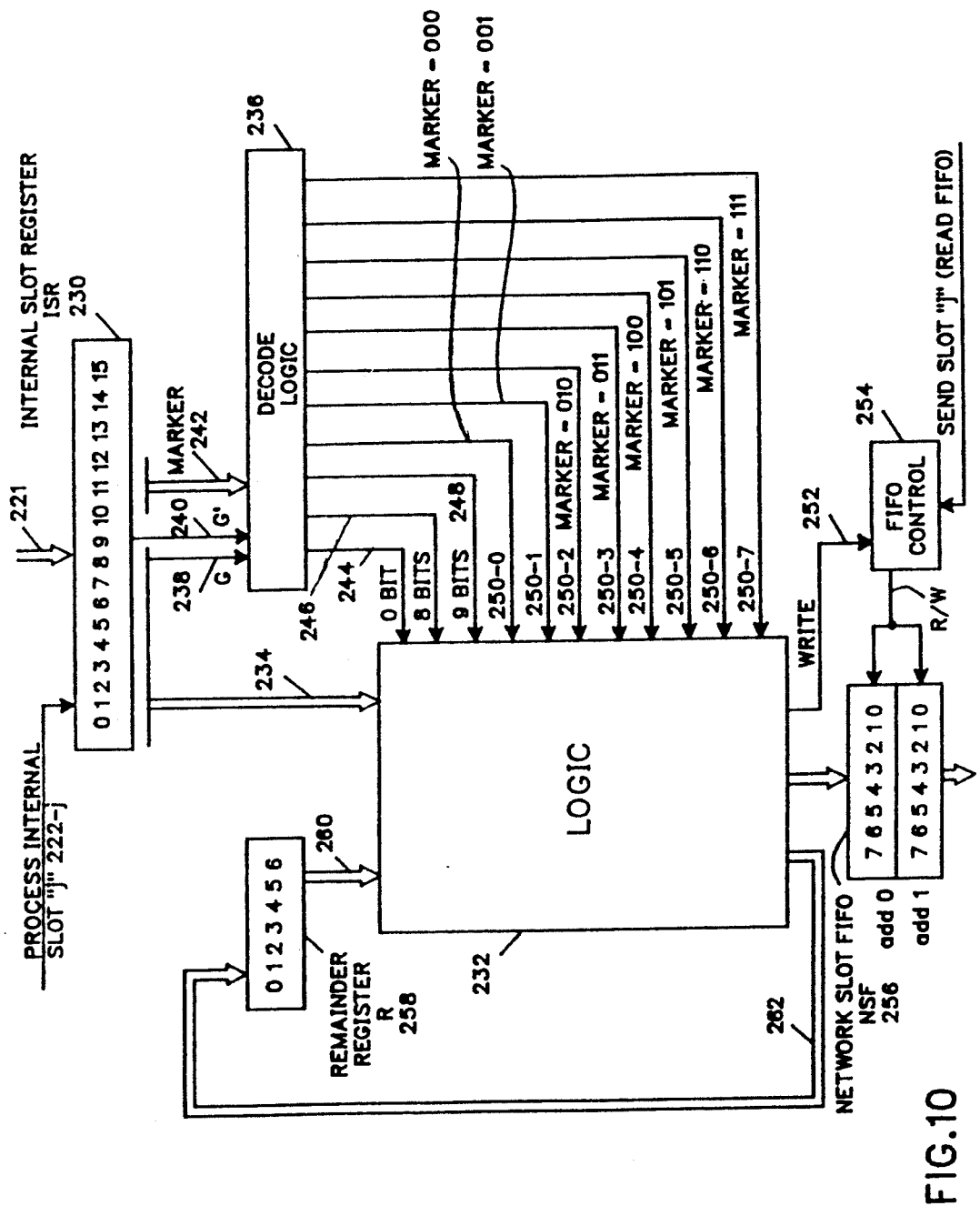
FIG. 10 represents the implementation of the logic circuitry needed for decoding a slot of the internal frames.

Decoding circuit 26-1 comprises a circuit such as shown in FIG. 10 for processing each slot "j". Components of such a circuit can be shared by the circuits needed for processing the successive slots.

In response to the activation of the PROCESS SLOT "j" signal on line 22-j, the internal slot "j" contents is gated from register 220 to INTERNAL SLOT register ISR 230 through bus 221. The contents of bit positions 0 to 8 of register ISR 230 are provided to a logic circuit 232 through bus 234, the G and G' bits are provided to a decode logic 236 through lines 238 and 240 and the marker bits are provided to the decode logic 236 through bus 242.

The decode logic 232 activates one of its output lines 244, 246, 248 which indicates the number of data bits in the internal slot, namely 0 bit, 8 bits or 9 bits, respectively depending upon the value of the G and G' bits. It generates control signals on its output lines 250-0 to 250-6 which are activated depending upon the decoded marker value 000 to 111 respectively.

The logic circuit 232 receives the bits from bit positions 0 to 8 of register 230 through the bus 234 and the contents of a remainder register 258 through bus 260.

In response to the active signals on lines 244, 246, 248 and 250-1 to 250-0, the logic circuit 232 generate a write control signal on line 252 to a FIFO control circuit 254 which causes selected bits from the bit position ISR 0-8 of register 230 and possibly remaining bits R 0-6 stored in remainder register 258 to be written into one addressed position of FIFO memory NSF 256 in selected bit positions NSF 0-7. Remaining bits R 0-6 are stored in register R 258 by means of bus 262.

The SEND SLOT "j" signal is provided to the FIFO control circuit 254 to gate the network slot contents from one addressed position of the FIFO memory to register 236.

The table hereunder indicates the selected bit positions of register ISR 0-8 and R 0-6 written in bit positions NSF 0-7 and R 0-1 according to the values of G and G' bits and marker bits.

TABLE

| DECODE | | WRITE OPERATION | |
|---|---|---|---|
| GG' | MARKER | FROM | TO |
| 10 | | ISR 0-7 | NSF 0-7 |
| 01 | 000 | ISR 1-8 | NSF 0-7 |
| | | ISR 0 | R 0 |
| | 001 | I R 0 | NSF 7 |
| | | ISR 2-8 | NSF 0-6 |
| | | ISR 0-1 | R 0-1 |
| | 010 | R 0-1 | NSF 7-6 |
| | | ISR 3-8 | NSF 0-5 |
| | | ISR 0-2 | R 0-2 |
| | 011 | R 0-2 | NSF 7-5 |
| | | ISR 4-8 | NSR 0-4 |
| | | ISR 0-3 | R 0-3 |
| | 100 | R 0-3 | NSF 7-4 |
| | | ISR 5-8 | NSF 0-3 |
| | | ISR 0-4 | R 0-4 |
| | 101 | R 0-4 | NSF 7-3 |
| | | ISR 6-8 | NSR 0-2 |
| | | ISR 0-5 | R 0-5 |
| | 110 | R 0-5 | NSF 7-2 |
| | | ISR 7-8 | NSF 0-1 |
| | | ISR 0-6 | R 0-6 |
| | 111 | R 0-6 | NSF 7-1 |
| | | ISR 8 | NSF 0 |
| | | ISR 0-7 | NSF 0-7 |
| 00 | | NO WRITE | |

A FIFO memory 256 is needed, because when the marker bits are 111, two bytes are made available during the slot processing time.

The detailed implementation of the synchronization device has been made assuming that the slot on the external link comprises x=8 data bits and that the slot on the internal link can be filled with 0 data bit, x data bits, or x+1 data bits as indicated by the delimiting configuration G and G' bit. In that case m=3 marker bits are needed to indicate the most significant bit of a byte within the internal slot.

This implementation allows to correct asynchronies between T0 and T12, up to 10%.

It will be obvious for a man skilled in the art, using the teaching of the present description to design the encoding logic circuit and decoding logic circuit in order to be able to implement the invention when x is different from 8, and/or r is higher than 1. At least m marking bits are necessary to indicate the position of one reference bit of the byte, for example the most significant bit as described above, m is chosen such as $2^m$ is at least equal to x. Additional bits G' are necessary for delimiting the valid data bits, in the preferred embodiment of the invention, however any other encoding can be used for indicating the number of valid bits, the use of only one G' bit presents the advantage of saving bits in the internal slots. Thus, the minimum number of bits in the internal slots is equal to $x+r+1+m$, a higher number can be chosen depending upon the specific implementation and the specific encoding of the valid number of data bits and of the marking bits.

We claim:

1. A synchronization device implemented in a communication node (10) which comprises switching means (24) operating under control of a clock signal of period T (T0) for exchanging information slots carried in external frames of period T' (T12 or T14), with each frame comprising n slots, with each slot comprising x data bits, between external Time Division Multiplex (TDM) links (12-1 to 12-K, or 14-1 to 14-K) attached to the communication node, said synchronization device preventing the slippage phenomena, due to the asynchronies between T and T', from occurring, said synchronization device comprises:

internal links (20-1 to 20-k, 22-1 to 22-m) attached to the switching means, internal frame encoding means (16-1 to 16-k, 18-1 to 18-m) for receiving the external frames from the external TDM links and generating therefrom internal frames of period T which are sent on the internal links in successive periods T, said internal frames comprising n slots with each slot comprising y bits, with y higher than $x+r$, where r is an integer number comprised between 1 and x, said internal frame encoding means being responsive to the contents of each slot "j", with j=1 to n received during successive period T' from each external link for generating a corresponding internal slot "j" during each period T, said corresponding internal slot "j" comprising a variable number d of data bits comprised between 0 and $x+r$, with the variable number d of data bits being set by coding values assigned to at least two validation bits (G, G') and encoding values assigned to at least three marker bits (M1, M2 and M3), and internal frame decoding means (26-1 to 26-k, 28-1 to 28-m) for receiving the internal frames switched by the switching means and generating therefrom the external frames to be sent to the external links, said internal frame decoding means being responsive to the contents of each slot "j" received from each internal link for preparing the x data bits to be sent in the corresponding external slot of the external frame.

2. A synchronization device according to claim 1 characterized in that the internal frame decoding means is comprised for each link and for each slot "j" in the internal frames;

first storing means (230) having a y-bit storing capacity, for storing the slot "j" contents received from the internal link under control of the internal slot "j" processing signal 9222-j), second storing means (256) having at least a two x-bit bytes storing capacity, and logic means (236,232,258) responsive to the value of the m bits and to the bit pattern indicative of the number of valid data bits stored in the second storing means for retrieving the x-bit bytes in the first storing means and gating said x-bit bytes into the second storing means.

3. A synchronization device implemented in a communication node (10) which comprises switching means (24) operating under control of a clock signal of period T (T0) for exchanging information slots carried in external frames of period T' (T12 or T14), with each frame comprising n slots, with each slot comprising x data bits, between external Time Division Multiplex (TDM) links (12-1 to 12-K, or 14-1 to 14-K) attached to the communication node, said synchronization device preventing the slippage phenomena, due to the asynchronies between T an T' from occurring, said synchronization device comprises:

internal links (20-1 to 20-k, 22-1 to 22-m) attached to the switching means, internal frame encoding means (16-1 to 16-k, 18-1 to 18-m) for receiving the external frames from the external TDM links and generating therefrom internal frames of period T which are sent on the internal links in successive periods T, said internal frames comprising n slots with each slot comprising y bits, with y higher than $x+r$ or at least equal to $x+r+1+m$, where r is an integer number comprised between 1 and x and m being an integer number such as $2^m$ is at least equal to x, said internal frame encoding means being responsive to at least eight data bits of each slot "j", with j=1 to n received during successive period T' from each external link for generating a corresponding internal slot "j" during each period T, said corresponding internal slot "j" comprising a variable number d of data bits comprised between 0 and $x+r$, with said number d is equal to 0 if no byte from the slot "j" has been received from the external frame, or is equal to x if one byte from the slot "j" has been received, or is comprised between $x+1$ and $x+r$ if two bytes have been received from two slots "j" of two external frames, in that case the slot "j" on the internal link comprises data bits taken from two successively received bytes, and the position of a reference bit of the second byte is encoded by means of the m additional bits, and internal frame decoding means (26-1 to 26-k, 28-1 to 28-m) for receiving the internal frames switched by the switching means and generating therefrom the external frames to be sent to the external links, said internal frame decoding means being responsive to the contents of each slot "j" received from each internal link for preparing the x data bits to be sent in the corresponding external slot of the external frame.

4. A synchronization device according to claim 3, characterized in that the internal frame encoding means comprises for each external TDM link:

external frame processing means (52,54) connected to the external TDM link for receiving the external frames in the successive period T' and for assembling the byte contained in each slot and generating j Process Network slot signals, with j="1 to n", on output lines (56j) with each line being activated when the byte contained in the corresponding slot "1 to n" has been assembled, and n external slot "1 to n" sending control signals (224-1 to 224-n) which are sequentially activated during a period T' and provided to the internal frame decoding means for sending the bytes prepared by said internal frame decoding means to the external TDM link;

internal frame processing means (58) responsive to a clock signal of period T for generating n internal slot "1 to n", preparing control signals (64-1 to 64-n) and n internal slot processing control signals (222-1 to 222-n) which are sequentially activated during the period T;

encoding means (16-1) responsive to the j Process Network Slot signals, to the n internal slot "1 to n" preparing control signals and to the bytes if any, which have been assembled when said internal slot "1 to n" preparing control signals are activated, to generate the y-bit contents of the slot to be sent in the internal frames.

5. A synchronization device according to claim 4 characterized in that the encoded means comprises for each slot "j":

first storing means (80,82) having at least a two x-bit bytes storing capacity for storing the bytes assembled from the contents of slot "j" by the external frame receiving means;

second storing means (138) having a y-bit storing capacity, third storing means (106) having a (x-r)-bit storing capacity means (96,98,100,148) responsive to the internal slot "j" preparing control signal and to the number of bytes stored in the first storing means for:

gating no data byte or one x-bit data byte from the first storing means to the second storing means if 0 byte or 1 byte are stored in the first storing means, respectively or gating x data bits from the first received byte and r bits of the second received byte if two bytes are stored in the first storing means and storing the x-r remaining bits of the received two bytes in the third storing means during a first period T and then during the successive periods T, gating the remaining bits from the third storing means and r1 bits of the next received byte such that $x-r+r1$ is lower than or equal to $x+r$, and storing the remaining bits in the third storing means if $x-r+1$ is higher than $x+r$, and performing this operation until the number of remaining bits is equal to 0.

6. A synchronization device according to claim 5, characterized in that the encoding means are responsive to the number of remaining bits to set the value of the m bits to the value indicative of the position of the reference bit of the byte partially stored in the second storing means.

7. A synchronization device according to any one of claims 3 to 6 characterized in that the number of data bits in the y-bit internal slot is indicated in a field comprising $x+r+1$ bits by a variable delimiting pattern comprising a bit which is set at first binary value (1) adjacent to the data bits and a variable number of bits set at a second binary value (0) which depends upon the number of data bits and is equal to $x+r$ if the y-bit internal slot contains no data bits, is comprised between 0 and r if the number of data bits is comprised between $x+r$ and x.

* * * * *